June 15, 1926.
G. VAN DAAM
1,589,269
LIQUID LEVEL GAUGE FOR LIQUID CONTAINERS
Filed April 25, 1924
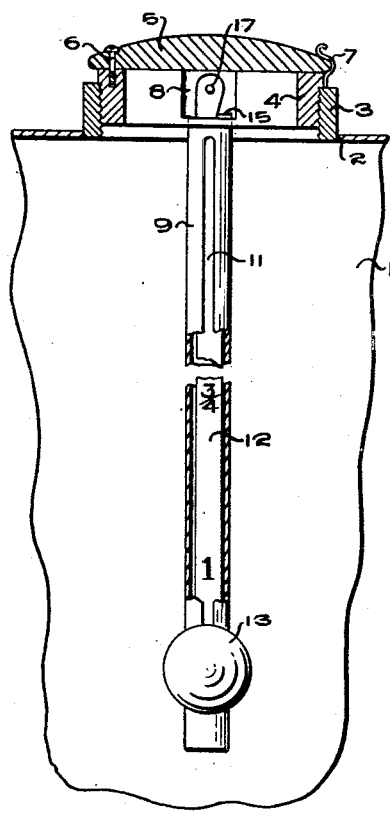
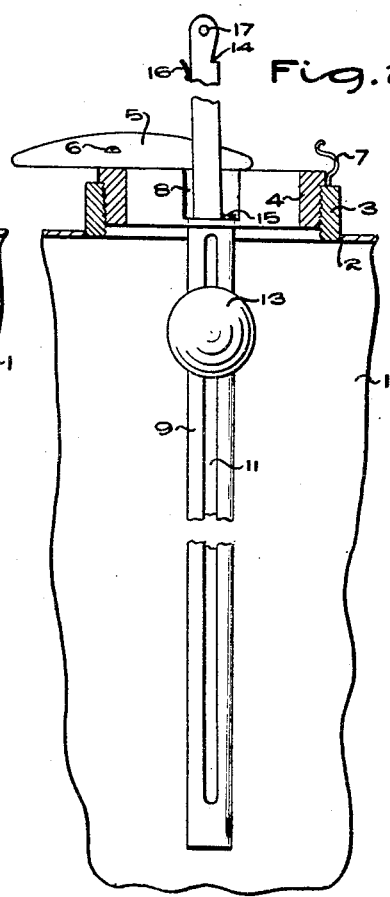
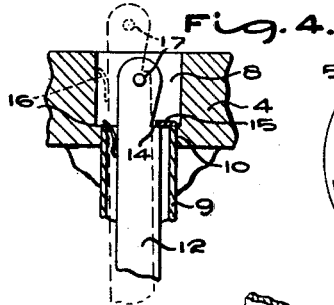
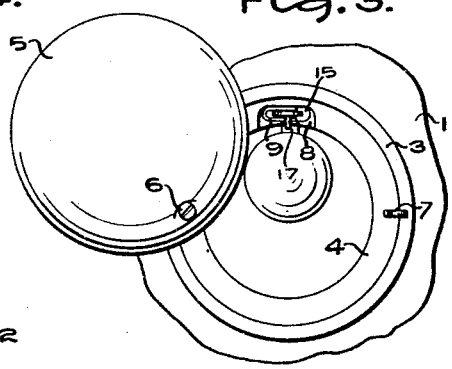
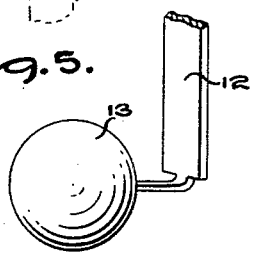
INVENTOR
GERRIT VAN DAAM.
BY
ATTORNEYS Patented June 15, 1926.

1,589,269

UNITED STATES PATENT OFFICE.

GERRIT VAN DAAM, OF BUFFALO, NEW YORK.

LIQUID-LEVEL GAUGE FOR LIQUID CONTAINERS.

Application filed April 25, 1924. Serial No. 709,031.

My invention relates to improvements in liquid level gauges for liquid containers, and the object of the invention is to construct a float actuated gauge, which will be particularly applicable to automobile gasolene tanks, and a further object is to construct a device, which can be readily applied to any standard tank without the necessity of making alterations in the same.

A still further object is to devise means, whereby the gauge can be locked in the inoperative position.

My invention consists of a gauge constructed and arranged all as hereinafter more particularly described and illustrated in the accompanying drawing in which:

Fig. 1 is an elevational view partly in section of my device, showing it positioned in an automobile tank, portion of tank and a sectional view through the filling orifice and cap being shown.

Fig. 2 is a similar view to Fig. 1 showing my gauge in the operative position.

Fig. 3 is a plan view of the filling cap, orifice and portion of the tank, my device being shown inserted into the filling orifice.

Fig. 4 is an enlarged detail of the upper end of the gauge, and the tubular housing therefor, the gauge being shown in full lines in the inoperative position and in dotted lines in the operative position, and Fig. 5 is an enlarged detail of the lower end of the gauge showing the float secured thereto.

Like characters of reference indicate the corresponding parts in the different views.

1 is the gasolene tank, provided with the filling orifice 2 having the usual internally threaded neck member 3 secured therein, such threaded neck member being normally adapted to receive the filler cap.

In my device 4 is a bushing threaded upon its exterior face and adapted to be threaded into the neck member 3. 5 is a filler cap swingably mounted upon the upper face of the bushing 4, by means of the headed stud 6, which is threaded thereinto, and 7 is a clip spring secured upon the outer face of the bushing 4 and adapted to engage the cap 5 and secure it in the closed position.

8 is a recess in the inner face of the bushing 4, extending downwardly from its upper or exposed face to a point intermediately of the depth of the bushing.

9 is a length of flattened or oval tubing, its upper end extending through, and secured in, an orifice 10 in the lower face of the bushing 4, such orifice 10 communicating with the lower face of the recess 8, the top of the tubing 9 being flush therewith, and 11 is a long longitudinally extending slot in the tube 9.

12 is a gauge member slidably mounted in the tubing 9, its lower end being reduced and bent outwardly so as to pass freely through the slot 11. 13 is a float suitably secured upon the outer end of such reduced lower portion. The upper end of the gauge member 12 is provided with a notch 14, adapted to engage a cross piece 15 which is secured upon one side of the upper end of the tube. 16 is an outwardly extending leaf spring secured to the gauge member 12 in the vicinity of its upper end, being oppositely positioned to the notch 14, such spring being adapted to engage the inner face of the tube 9, so as to bring the notch 14 into engagement with the cross piece 15, and 17 is an outwardly extending finger provided upon the inner face of the gauge member 12, in the vicinity of its upper end.

In applying my device to an automobile tank it is merely necessary to unscrew the filler cap, inserting my device in lieu thereof, the bushing 4 taking the place of the filler cap, the internal diameter of the bushing being of sufficient size to permit the filling hose nozzle to be inserted in the usual manner. When the tank is filled, the float 13 will be submerged, as an upward movement of the gauge member 12 is prevented by the engagement of the notch 14 with the cross piece 15, under the influence of the spring 16.

Upon desiring to ascertain the amount of gasolene in the tank it is merely necessary to open the cap 5 and move the top of the gauge member 12 to one side by means of the finger 17, whereby the notch 14 will be disengaged from the cross piece 15, thus permitting the gauge member 12 to rise under the influence of the float 13, such gauge member being suitably graduated to show the quantity of gasolene in the tank.

Upon desiring to restore the gauge to its original or inoperative position, it is merely necessary to push it downwardly until the notch 14 comes into engagement with the cross piece 15, under the influence of the spring 16. The cap 5 is then swung into the closed position.

From the above description it will be seen that I have devised a simple and effective liquid level gauge which can be quickly and readily applied to any standard automobile tank, without necessity of making any alterations, and also I have devised means whereby the gauge can be secured in the inoperative position, thus preventing any damage to the gauge member or float whilst the tank is being filled.

What I claim as my invention is:

1. A liquid level gauge comprising, in combination with a tank having an orifice therein, a bushing secured in said orifice, an upper open ended tube extending downwardly from the bushing, a notched float actuated gauge member slidable in the tube, a cross piece positioned upon one side of the upper open end of the tube, and resilient means for bringing the notch in the gauge member into engagement with the cross piece on the tube.

2. A liquid level gauge, comprising a bushing, a guide tube depending from the bushing, a gauge member movable therein and provided with a notch in its upper end to form a shoulder, a cross piece partially closing the upper end of the tube at one side and adapted to hold the gauge member depressed through its engagement with the shoulder, a flat spring for holding the shoulder and cross piece in engagement, one end of said spring being secured to the gauge member opposite the notch portion and having its other end disposed to bear against the said tube for exerting a pressure on the gauge member in order to hold the aforesaid shoulder in co-operative relation to the cross piece and a float connected to the gauge member for raising it when the shoulder is disengaged from said cross piece.

GERRIT VAN DAAM.